March 4, 1958  A. W. SIEVING ET AL  2,825,232
GEAR TYPE POWER TRANSMISSION
Filed Jan. 19, 1955  2 Sheets-Sheet 1

INVENTORS
ALFRED W. SIEVING
JOSEPH G. KLECKER
BY
Fryer and Johnson
ATTORNEYS

March 4, 1958  A. W. SIEVING ET AL  2,825,232
GEAR TYPE POWER TRANSMISSION
Filed Jan. 19, 1955  2 Sheets-Sheet 2
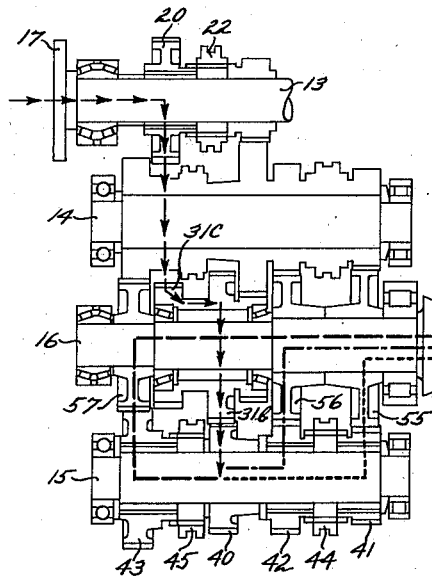
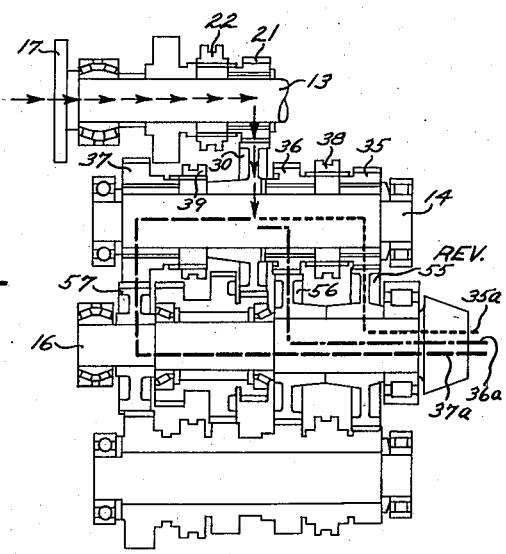
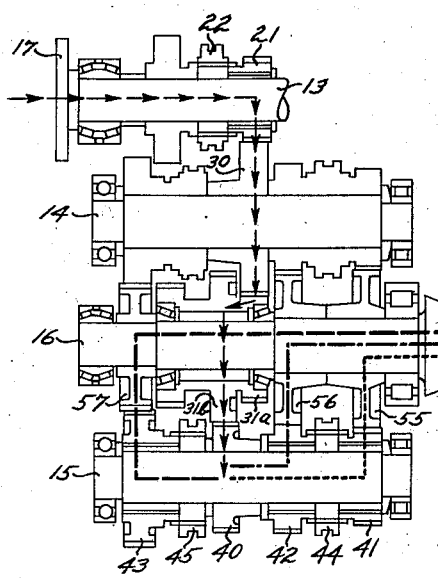
INVENTORS
ALFRED W. SIEVING
JOSEPH G. KLECKER
BY
ATTORNEYS

United States Patent Office 2,825,232
Patented Mar. 4, 1958

2,825,232

GEAR TYPE POWER TRANSMISSION

Alfred W. Sieving and Joseph G. Klecker, Peoria, Ill., assignors to Caterpillar Tractor Co., Peoria, Ill., a corporation of California Application January 19, 1955, Serial No. 482,837

2 Claims. (Cl. 74—331)

This invention relates to speed-change transmissions and has for its object a six-speed forward and six-speed reverse power transmission of a compact arrangement whereby a transmission of this speed range and design may be installed in the same axial distance required for transmissions having fewer speed changes. It also has for its object the arrangement of a pair of countershafts, in a transmission, parallel to and equidistant from an output shaft, thereby allowing the use of several pairs of interchangeable gears on the countershafts.

Another object of the invention is to support the speed-change gears, which are used in the lower half of the speed range, on one countershaft, and the speed-change gears which are used in the upper half of the speed range on another countershaft, so that the wear, to which the shaft-supporting bearings are subjected, will tend to be divided.

In the drawings:

Fig. 3 is like Fig. 2 but showing the power path used in the forward drive in the fourth, the fifth and the sixth speeds;

Fig. 4 is a developed schematic view of the transmission shafts and gears showing their relationship while the transmission is driving in reverse and the power path used in the reverse drive in the first, the second and the third speeds; and Fig. 5 is like Fig. 4 showing the power path used in the reverse drive in the fourth, the fifth and the sixth speeds.

Figure 1:
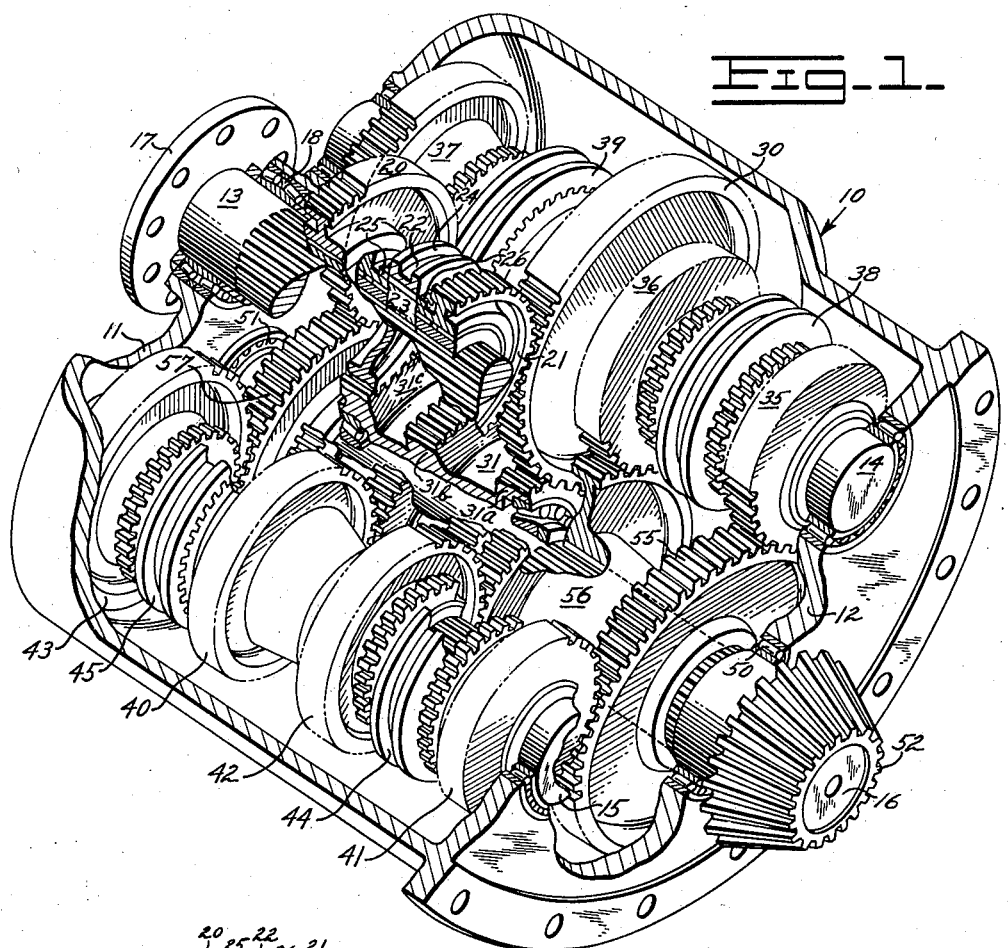
Fig. 1 is a perspective view of the transmission case with parts broken away to show the supporting shafts and the speed-change gear arrangement.

In Fig. 1 a transmission-containing case 10 is shown to be of a generally cylindrical shape, having a forward end wall 11 and a rearward end wall 12, provided with suitable apertures to support an input shaft 13, a pair of countershafts 14 and 15, and an output shaft 16 parallel to and beneath the input shaft. All of these shafts are rotatably supported in the transmission case by suitable bearings.

The input shaft is adapted to be connected to a source of power by means of a flange 17, and is illustrated as the upper shaft in this transmission supported by bearings in the end walls of the case, one of which is shown at 18. Although the input shaft is shown as the upper shaft in this transmission and the output pinion shaft is shown in a lower position, their relative vertical positions are not important.

The input shaft rotatably carries a forward input gear 20 and a reverse input gear 21. Either of these gears may be connected in a driven relationship to the input shaft by means of a positive drive clutch 22 carried on the shaft. The internal driving member 23 of the clutch 22 is splined to the input shaft 13, and an annular shifting collar 24 is provided with internal teeth which are adapted to be engaged with external teeth of the clutch driving member, as well as with external teeth provided on a shoulder 25 of the forward input gear 20, and external teeth on an indentical shoulder 26 of the reverse input gear 21. This positive drive clutch is of a conventional design commonly employed in a constant-mesh type transmission, and the toothed shoulders of the gears 20 and 21 are also of a standard design and adapted to cooperate with the shifting collar 24 of the clutch 22. Other positive drive clutches, which will be described later, are also used in the transmission, to effect engagement of the speed-change gears, and are identical in design and size to the clutch 22 to facilitate interchangeability of parts. All of the speed-change gears used in the transmission are also provided with toothed shoulders identical to those of the input gears 20 and 21, and adapted to mesh with the shift collars of the clutches used to engage the speed-change gears.

The first countershaft 14 carries a drive gear 30 which is splined to the countershaft (or may be formed integrally therewith) and meshes with a gear portion 31a of a cluster drive gear 31 rotatably mounted on the output shaft 16. Rotatably carried on the first countershaft is a group of speed-change gears used in the lower half of the speed range of the transmission; namely, a first speed gear 35, a second speed gear 36 and a third speed gear 37. These speed-change gears may be selectively connected to the countershaft in driven relationship by means of conventional, positive-drive clutches 38 and 39.

The second countershaft 15 carries a drive gear 40 which is splined to the countershaft (or may be formed integrally with the shaft) and meshes with a gear portion 31b of the cluster gear 31. Rotatably carried on the second countershaft is another group of speed-change gears used in the upper half of the speed range of the transmission; namely, a fourth speed gear 41, a fifth speed gear 42 and a sixth speed gear 43. These speed-change gears are also adapted to be selectively connected to the second countershaft in a driven relationship by means of positive clutches 44 and 45.

The output shaft 16 is shown as being located in the lower portion of the transmission case, supported by suitable bearings shown at 50 and 51, and having a pinion 52 which is non-rotatably secured to the output shaft 16, or may be formed integrally therewith. The output pinion shaft non-rotatably carries three output shaft drive gears 55, 56 and 57; these output shaft gears are arranged so that gear 55 meshes with the first and the fourth speed-change gears 35 and 41, output drive gear 56 meshes with the second and the fifth speed-change gears 36 and 42, and the output drive gear 57 meshes with the third and the sixth speed-change gears 37 and 43. By spacing the countershafts 14 and 15 equidistant from the output pinion shaft 16, each pair of speed-change gears which meshes with its mating output drive gear may utilize identical gears in each pair. Therefore, the first speed gear 35 and the fourth speed gear 41 are identical; the second speed gear 36 and the fifth speed gear 42 are identical; and the third speed gear 37 and the sixth speed gear 43 may also be identical.

The cluster drive gear 31 which is rotatably mounted on the output pinion shaft 16 has a third gear portion 31c. This gear portion 31c is constantly in mesh with the forward input gear 20, while the central gear portion 31b is in mesh with the second countershaft drive gear 40, and the rearward gear portion 31a is in mesh with the first countershaft drive gear 30. As pointed out above, by shifting the collar 24 of the conventional, positive drive clutch 22, either the forward input gear 20 or the rearward input gear 21 may be selectively engaged in the power train. All of the positive drive clutches used in the transmission may be shifted by any suitable linkage. Although none of the shifting mechanism is shown in the drawings, it is a common practice to provide separate levers, one for the selection of the forward and the reverse gears, and another for the speed-change gears.

Figure 2:
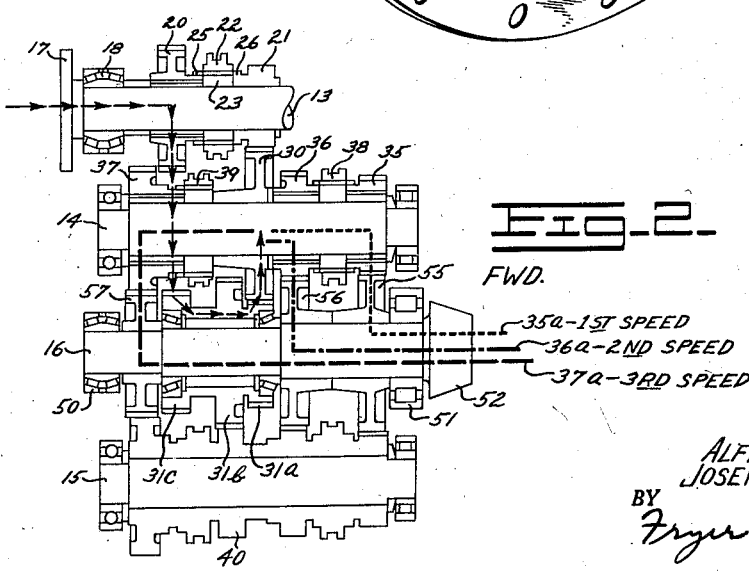
Fig. 2 is a developed schematic view of the transmission shafts and gears showing their relationship while the transmission is driving in a forward direction, and the power path used in the forward drive in the first, the second and the third speeds.

While the transmission is driving in a forward direction through engagement of the positive drive clutch 22 with the forward input gear 20, power is transmitted from the input gear to the cluster drive gear 31 through the gear portion 31c which is in mesh with the forward input gear 20. Both the first and the second countershafts 14 and 15 are driven by the gear portions 31a and 31b, respectively, meshing with the countershaft drive gears 30 and 40. Any of the speed-change gears may then be selectively engaged in the power train by shifting the collars of any one of the clutches 38, 39, 44 and 45 to drive the output shaft 16 through one of the output drive gears 55, 56 and 57, which are splined to the output shaft. As shown in Fig. 2, the clutch 22 is engaged with the forward input gear 20, thereby causing the transmission to drive in a forward direction. The power path, indicated by the line of arrows, is then from the input shaft 13, through the forward input gear 20 to the cluster drive gear 31 and then to the first countershaft 14 through its drive gear 30 by means of cluster gear portion 31a, and also to the second countershaft 15 through its drive gear 40 by means of cluster gear portion 31b. When one of the three speed-change gears 35, 36, or 37 is engaged, the power is transmitted from the first countershaft 14 to the output pinion shaft 16 by one of the paths indicated by the broken lines 35a, 36a or 37a, respectively.

As shown in Fig. 3, if any one of the three speed-change gears 41, 42 or 43 is engaged, the power is transmitted from the second countershaft 15 to the output shaft 16 by one of the paths indicated by the broken lines 41a, 42a or 43a, respectively.

To drive the transmission in reverse, the clutch 22 is shifted to engage the reverse input gear with the input shaft, and power is then transmitted through the countershaft drive gear to the first countershaft. If any one of the lower range speed-change gears is engaged, power from the input shaft is transmitted directly to one of the output gears to by-pass the cluster drive gear 31; this condition is shown in Fig. 4. If one of the upper range speed-change gears is engaged, the power path is then from the first countershaft drive gear 30 (which now acts as a reverse idler gear) through gear portion 31a of the cluster drive gear 31, and then to the second countershaft 15 through the central gear portion 31b meshing with the countershaft drive gear 40. The power path continues from the second countershaft 15 to the engaged speed-change gear to its respective mating output gear on the output pinion shaft 16 in the same manner as when the transmission is driven in a forward direction. This condition is shown in Fig. 5.

A transmission having six speeds forward and six speeds in reverse is thus provided by arranging a pair of countershafts parallel to and equally spaced from the output shaft, which reduces the axial distance required for a transmission of this speed range, and allows the use of pairs of interchangeable speed-change gears. By using several identical, positive drive clutches and by using identical countershafts, maximum interchangeability of parts within the transmission may be accomplished.

We claim:

1. A speed-change transmission comprising an input shaft, a first countershaft, a second countershaft, an output shaft, forward and reverse driving gears carried on the input shaft, clutch means to selectively connect the forward and the reverse gears in a driven relationship to the input shaft, a cluster gear carried on the output shaft provided with one gear portion meshing with said forward driving gear, another gear portion meshing with a first countershaft driving gear, and another gear portion meshing with a second countershaft driving gear, a plurality of speed-change gears carried on the countershafts and meshing with drive gears carried on the output shaft, and clutch means on the countershafts to selectively include any of the speed-change gears in the power train.

2. A speed-change transmission comprising two main shafts for input and output, a first countershaft, a second countershaft, forward and reverse driving gears carried on one of said main shafts, clutch means to selectively connect the forward and the reverse gears in a driving relationship to said one main shaft, a cluster gear carried on the other of said main shafts provided with one gear portion meshing with said forward driving gear, another gear portion meshing with a first countershaft driving gear and another gear portion meshing with a second countershaft driving gear, a plurality of speed-change gears carried on the countershafts and meshing with drive gears carried on said other main shaft, and clutch means on the countershafts to selectively include any of the speed-change gears in the power train.

References Cited in the file of this patent

UNITED STATES PATENTS 2,456,894    Ryker _____ Dec. 21, 1948